US012587598B1

(12) United States Patent
Salazar et al.

(10) Patent No.: US 12,587,598 B1
(45) Date of Patent: Mar. 24, 2026

(54) AUTOMATED PROOFING IN INTERACTIVE VOICE RESPONSE

(71) Applicant: United Services Automobile Association (USAA), San Antonio, TX (US)

(72) Inventors: Gabrielle Diane Salazar, San Antonio, TX (US); Dustin Bowen Bitter, Lehi, UT (US); Mitzi Ruiz, San Antonio, TX (US); Jeanie Graciela Lopez, San Antonio, TX (US); Oscar Guerra, San Antonio, TX (US); William Daniel Farmer, Carrollton, TX (US); Jennifer Marie Chandler-Bradley, Tampa, FL (US)

(73) Assignee: United Services Automobile Association (USAA), San Antonio, TX (US)

( * ) Notice: Subject to any disclaimer, the term of this patent is extended or adjusted under 35 U.S.C. 154(b) by 87 days.

(21) Appl. No.: 18/402,222

(22) Filed: Jan. 2, 2024

Related U.S. Application Data

(60) Provisional application No. 63/436,782, filed on Jan. 3, 2023.

(51) Int. Cl.
  *H04M 3/22* (2006.01)
  *H04M 3/493* (2006.01)
(52) U.S. Cl.
  CPC ......... *H04M 3/2236* (2013.01); *H04M 3/493* (2013.01)

(58) Field of Classification Search
  CPC ........................... H04M 3/2236; H04M 3/493
  See application file for complete search history.

(56) References Cited

U.S. PATENT DOCUMENTS

| | | | | |
|---|---|---|---|---|
| 6,600,736 | B1 * | 7/2003 | Ball ...................... | H04L 67/142 |
| | | | | 370/352 |
| 8,041,575 | B2 * | 10/2011 | Agarwal ................. | H04M 3/58 |
| | | | | 704/270.1 |
| 8,155,276 | B2 * | 4/2012 | Beauregard ........... | H04M 3/493 |
| | | | | 379/74 |
| 8,345,851 | B2 * | 1/2013 | Vadlakonda .......... | H04M 3/493 |
| | | | | 713/155 |
| 10,506,426 | B1 * | 12/2019 | Rule ...................... | H04M 15/06 |
| 11,729,624 | B2 * | 8/2023 | Rule ....................... | H04L 63/08 |
| | | | | 455/411 |
| 12,425,392 | B2 * | 9/2025 | Mavani ............... | H04L 63/0861 |

(Continued)

*Primary Examiner* — Lisa Hashem
(74) *Attorney, Agent, or Firm* — Fletcher Yoder, P.C.

(57) ABSTRACT

An authentication service proofs a user by identifying expected interactions and/or interaction characteristics of the user with an interactive voice response system. Specifically, during an interactive voice response (IVR) system session, an initial proofing of a user via one or more credentials supplied by the user via the IVR system session is performed. Interactions by the user with the IVR system are tracked. After the initial proofing of the user, response datasets are recorded, providing an indication of the tracked interactions by the user and an association of a user account of the user in a response data store. Periodically, the response datasets are accessed and interaction-based proofing data rules are generated based at least in part upon the accessed response datasets. The interaction-based proofing data rules are provided for subsequent proofing of the user based upon subsequent actions of the user.

12 Claims, 3 Drawing Sheets

(56)     References Cited

U.S. PATENT DOCUMENTS

| | | | | |
|---|---|---|---|---|
| 2012/0074223 A1* | 3/2012 | Habraken | ............ | G06Q 20/409 |
| | | | | 235/382 |
| 2012/0269097 A1* | 10/2012 | Golato | .............. | H04M 3/42042 |
| | | | | 370/259 |
| 2013/0156170 A1* | 6/2013 | Springer | ............... | H04M 3/493 |
| | | | | 379/88.22 |
| 2016/0050219 A1* | 2/2016 | Niewczas | ............. | H04W 12/10 |
| | | | | 726/5 |
| 2016/0065370 A1* | 3/2016 | Le Saint | ................ | H04L 9/321 |
| | | | | 713/155 |
| 2016/0379217 A1* | 12/2016 | Hammad | ............ | G06Q 20/425 |
| | | | | 705/75 |
| 2019/0238517 A1* | 8/2019 | D'Agostino | ........ | H04L 63/0428 |
| 2019/0260732 A1* | 8/2019 | Narayan | ............. | H04L 63/0807 |
| 2025/0300843 A1* | 9/2025 | Graves | ................. | H04L 9/3263 |
| 2025/0323996 A1* | 10/2025 | Joshi | ....................... | H04M 3/38 |
| 2025/0337836 A1* | 10/2025 | Khan | ................. | H04L 65/1076 |

* cited by examiner

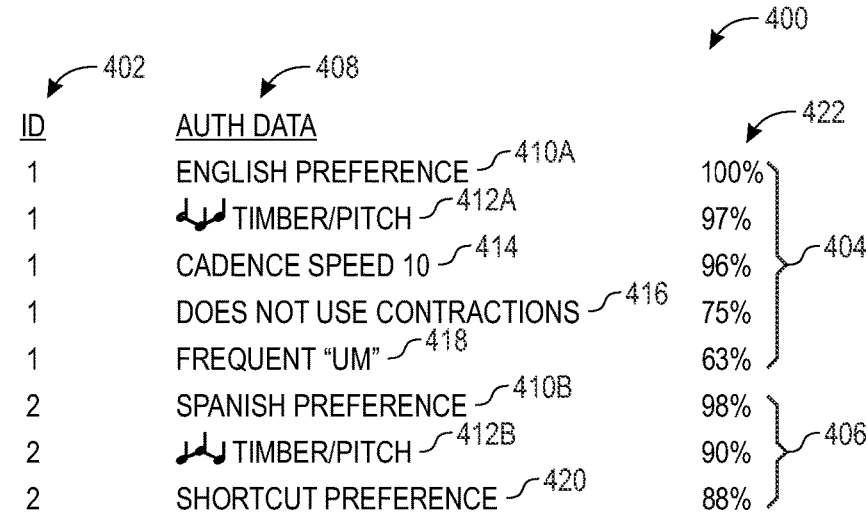

ID 402          AUTH DATA 408          400

| ID | AUTH DATA | 422 |
|----|-----------|-----|
| 1 | ENGLISH PREFERENCE ⌐410A | 100% |
| 1 | 🎵 TIMBER/PITCH ⌐412A | 97% |
| 1 | CADENCE SPEED 10 ⌐414 | 96% |
| 1 | DOES NOT USE CONTRACTIONS ⌐416 | 75% |
| 1 | FREQUENT "UM" ⌐418 | 63% |
| 2 | SPANISH PREFERENCE ⌐410B | 98% |
| 2 | 🎵 TIMBER/PITCH ⌐412B | 90% |
| 2 | SHORTCUT PREFERENCE ⌐420 | 88% |

404 (brace for ID 1 rows)
406 (brace for ID 2 rows)

"ID 2" 102  ⟷ 504  IVR 104

502

506 ~ PRESS 1 FOR SPANISH

← SPANISH PREFERENCE FAIL (-1 : 98%)

508 ...

← TIMBRE/PITCH MATCH (+1 : 90%)

510 ~ "BALANCE PLEASE"

-8% MATCH, DENY ACCESS OR REQUEST MORE DATA ~512

514 ~ DID YOU KNOW...

516 ~ OPERATOR

← SHORTER MATCH (+1 : 88%) ~518

80% MATCH REDUCED AUTHENTICATION REQUIREMENT

520 ~ PLEASE PROVIDE YOUR ZIP CODE

522 ~ 12345

524 ~ YOUR BALANCE IS $103,291

FIG. 5

AUTOMATED PROOFING IN INTERACTIVE VOICE RESPONSE

CROSS-REFERENCE TO RELATED APPLICATIONS

This application claims priority to and the benefit of U.S. Provisional Application No. 63/436,782, entitled "Automated Proofing in Interactive Voice Response," filed Jan. 3, 2023, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statement are to be read in this light, and not as admission of prior art.

Product and service offerings are being offered increasingly via remote interactions with a vendor's electronic services. With this increase in remote interactions facilitating tasks once performed onsite at a vendor's location, increased security measures may be desirable to mitigate any attempts at unauthorized access and/or use of the vendor's electronic systems. Traditional approaches have included prompting a user of the electronic services to provide personal information, such as a portion of their social security number, their full name, answers to previously answered security verification questions, etc. However, this traditional mechanism may be undesirable for many reasons. For one, answering such questions may be time consuming and repetitive. Further, providing this information may enable others with access to the electronic system to obtain private information of the user, which may cause security concerns, especially when similar information is likely used across many different electronic services. With this in mind, new techniques of indirect proofing of users of electronic systems is desirable.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments described herein relate to automated proofing of users of an electronic service via interactive voice response (IVR). In particular, IVR system interactions (e.g., voice responses, prompt answers, etc.) by a user, over time, may yield proofing data that may be used to authenticate that a user is who they say they are and/or believed to be, creating a less burdensome and more secure system for authenticating access to electronic services of the vendor or other third party vendors, when the vendor provides and/or otherwise facilitates a proofing service that may be used to authenticate a user via voice responses.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 4 is a schematic diagram, illustrating weighted proofing data used to proof a user via IVR responses, in accordance with certain embodiments; and FIG. 5 is a schematic diagram, illustrating a sequence of IVR interactions and proofing based upon those interactions, in accordance with certain embodiments.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to automated proofing a user of an electronic service via IVR responses. In particular, the present disclosure relates to services that utilize responses made during an IVR system session to discern whether a user is who they report to be, resulting in corresponding access to the electronic services based upon the proofing.

Figure 1:
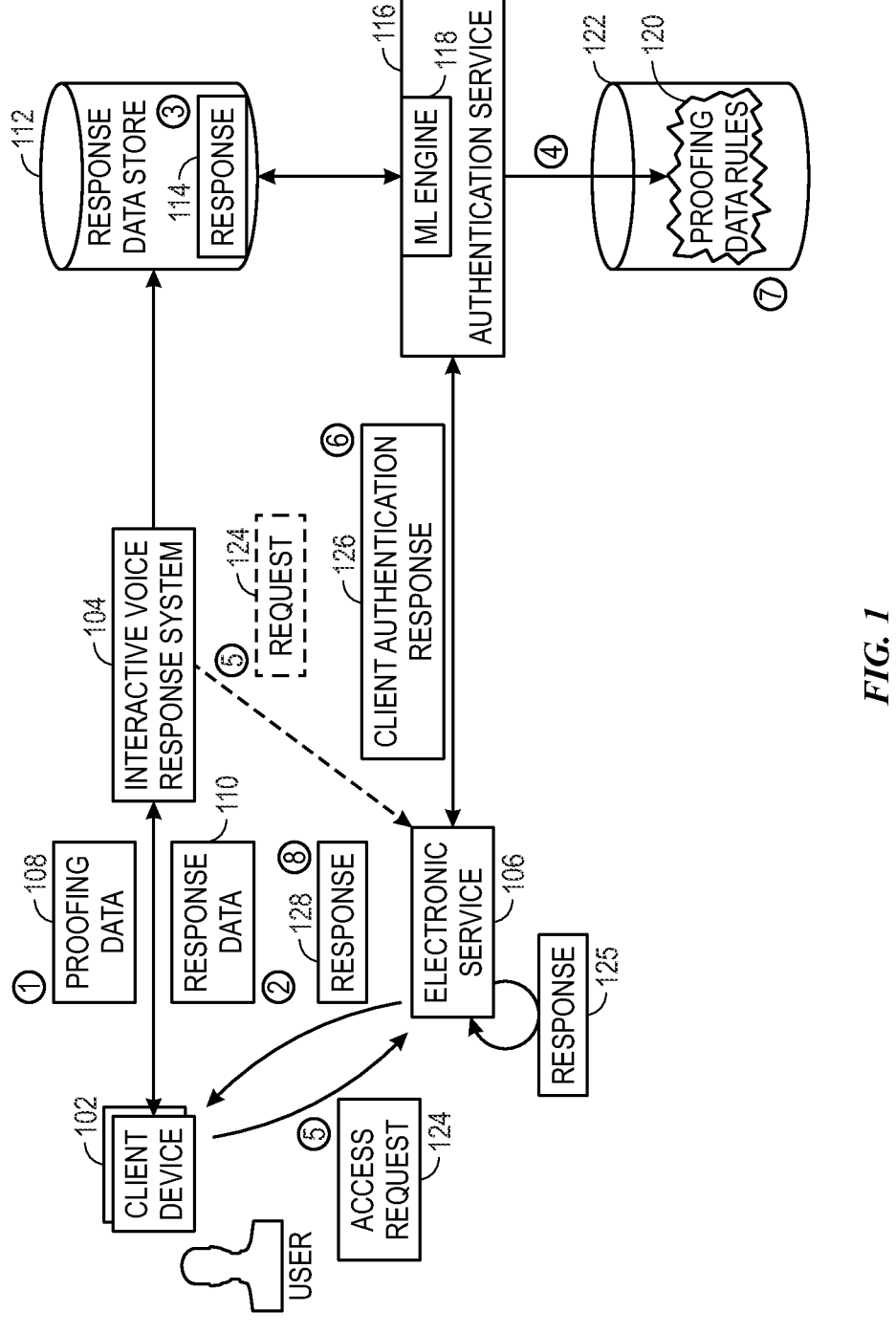
FIG. 1 is a schematic diagram, illustrating an IVR proofing system, in accordance with certain embodiments.
Figure 2:
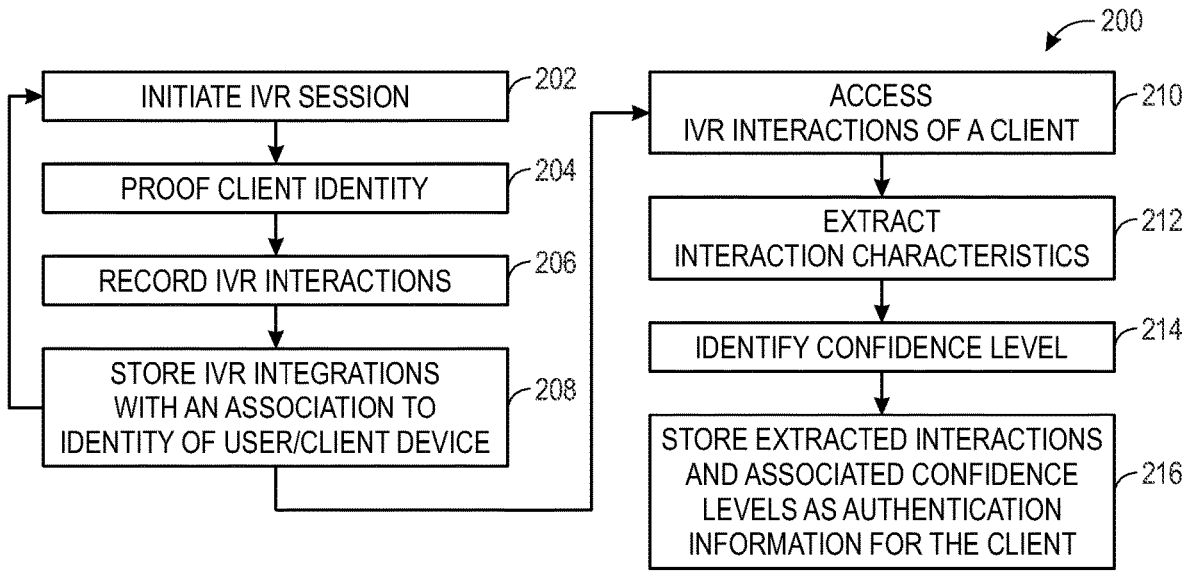
FIG. 2 is a flowchart, illustrating a process for generating IVR-response-based proofing rules, in accordance with certain embodiments.

With this in mind, FIG. 1 is a schematic diagram, illustrating an IVR proofing system 100, in accordance with certain embodiments. As may be appreciated, the system 100 may include a client device 102, which is an electronic device used to interact with an interactive voice response (IVR) system 104 and with an electronic service 106 (e.g., either directly or indirectly through the IVR system 104). As will be described herein, proofing data rules are generated based upon interactions/responses between a user and/or client device 102 and the IVR system 104. FIG. 2 is a flowchart, illustrating a process 200 for generating IVR-response-based proofing rules, in accordance with certain embodiments and will be discussed concurrently with the discussion of FIG. 1 pertaining to generation of such rules.

Upon initiating an IVR session (block 202), the interactions between the client device 102 and the IVR system 104 may be used to proof the user and/or client device 102 identity via proofing data 108 (e.g., data that may be used to identify interactions likely to indicate that a user is who they say they are and/or believed to be in subsequent interactions) (block 204).

Initially, when proofing data rules are not yet available, the proofing data 108 may include traditional proofing data 108, such as username and password information, personal information, etc. This creates confidence that interactions by the user and/or client device 102 are associated with the real user and/or client 102 and are not interactions of an imposter. Upon proofing the user and/or client 102 via the traditional proofing data 108, the response data 110 may be captured and recorded to the response data store 112 to be used in generation of proofing data rules.

Proofing data rules, which may be used to proof the user and/or client device 102 in subsequent interactions may be derived by recording/tracking interaction/response data 110 of a proofed user and/or client device 102 (block 206). For example, initial interactions and/or interactions over time with an IVR response system 104 may be used to identify patterns of interaction between the user and/or client device 102 and IVR system 104. Accordingly, response data indicative of these interactions may be provided to a response data store 112, which stores response data sets 114 associated to specific users and/or client devices 102 (block 208). The response data sets 114 may provide interactions/responses of a user over one or several sessions between the client device 102 and the IVR system 104.

To generate the proofing data rules, an authentication service 116 may, periodically access the response data sets 114 to derive proofing rules based upon discerned patterns found in the response data sets 114 (block 210). For example, the authentication services 116 may include a machine learning engine 118 that is useful for identifying correlated data between records found in the response data sets 114. The interactions/responses may be analyzed to extract characteristics of the interactions/responses that may be useful for pattern recognition by the machine learning engine 118 (block 212). Further, the machine learning engine 118 may compare and contrast the response data sets 114 and the extracted characteristics to discern confidences levels associated with particular interactions/responses and/or interaction/response characteristics and/or combinations of particular interactions/responses and/or interaction response characteristics (block 214).

As used herein, machine learning may refer to algorithms and statistical models that computer systems use to perform a specific task with or without using explicit instructions. For example, a machine learning process may generate a mathematical model based on a sample of the clean data, known as "training data," in order to make predictions or decisions without being explicitly programmed to perform the task. For example, as illustrated in FIG. 1, a subset of the response data sets 114 may be provided as training data to the authentication service 116 and/or machine learning engine 118. The machine learning engine 118 may, in some cases, also include data dictionaries that provide definitions for particular words that may be found in data coming from the first and/or second services. This may help the machine learning engine 118 identify correlations in data accessed from the response data store 112.

Depending on the inferences to be made, the machine learning engine may implement different forms of machine learning. In some embodiments, a supervised machine learning may be implemented. In supervised machine learning, the mathematical model of a set of transaction data contains both the inputs and the desired outputs. The set of transaction data is referred to as "training data" and is essentially a set of training examples. Each training example has one or more inputs and the desired output, also known as a supervisory signal. In a mathematical model, each training example is represented by an array or vector, sometimes called a feature vector, and the training data is represented by a matrix. Through iterative optimization of an objective function, supervised learning algorithms learn a function that can be used to predict the output associated with new inputs. An optimal function will allow the algorithm to correctly determine the output for inputs that were not a part of the training data. An algorithm that improves the accuracy of its outputs or predictions over time is said to have learned to perform that task.

Supervised learning algorithms may include classification and regression. Classification algorithms are used when the outputs are restricted to a limited set of values, and regression algorithms are used when the outputs may have any numerical value within a range. Similarity learning is an area of supervised machine learning closely related to regression and classification, but the goal is to learn from examples using a similarity function that measures how similar or related two objects (e.g. two behaviors from different users) are. It has applications in fraud detection, ranking, recommendation systems, visual identity tracking, face verification, and speaker verification.

Additionally and/or alternatively, in some situations, it may be beneficial for the machine learning engine 118 to utilize unsupervised learning (e.g., when particular output types are not known). Unsupervised learning algorithms take a set of transaction data that contains only inputs, and find structure in the data, like grouping or clustering of transaction data. The algorithms, therefore, learn from test data that has not been labeled, classified or categorized. Instead of responding to feedback, unsupervised learning algorithms identify commonalities in the transaction data and react based on the presence or absence of such commonalities in each new piece of transaction data.

Cluster analysis is the assignment of a set of observations (e.g., transaction datasets) into subsets (called clusters) so that observations within the same cluster are similar according to one or more predesignated criteria, while observations drawn from different clusters are dissimilar. Different clustering techniques make different assumptions on the structure of the transaction data, often defined by some similarity metric and evaluated, for example, by internal compactness, or the similarity between users of the same cluster, and separation, the difference between clusters. Predictions or correlations may be derived by the machine learning engine 118. For example, groupings and/or other classifications of the interaction data (e.g., the response data sets 114) may be used to predict correlations between the user and/or client device 102 and particular interactions/responses.

An indication of the correlated data may be used to generate proofing data rules 120, which are stored in a data repository 122 associated with the authentication service 116 (block 216). The data proofing rules 120 may include particular interactions/responses and/or interaction/response characteristics that likely identify that a user is who they say they are and/or such interactions/responses and/or characteristics that likely identify that a user is not who they say they are and/or believed to be. Examples of such rules 120 are provided in the discussion of FIG. 4 below.

Figure 3:
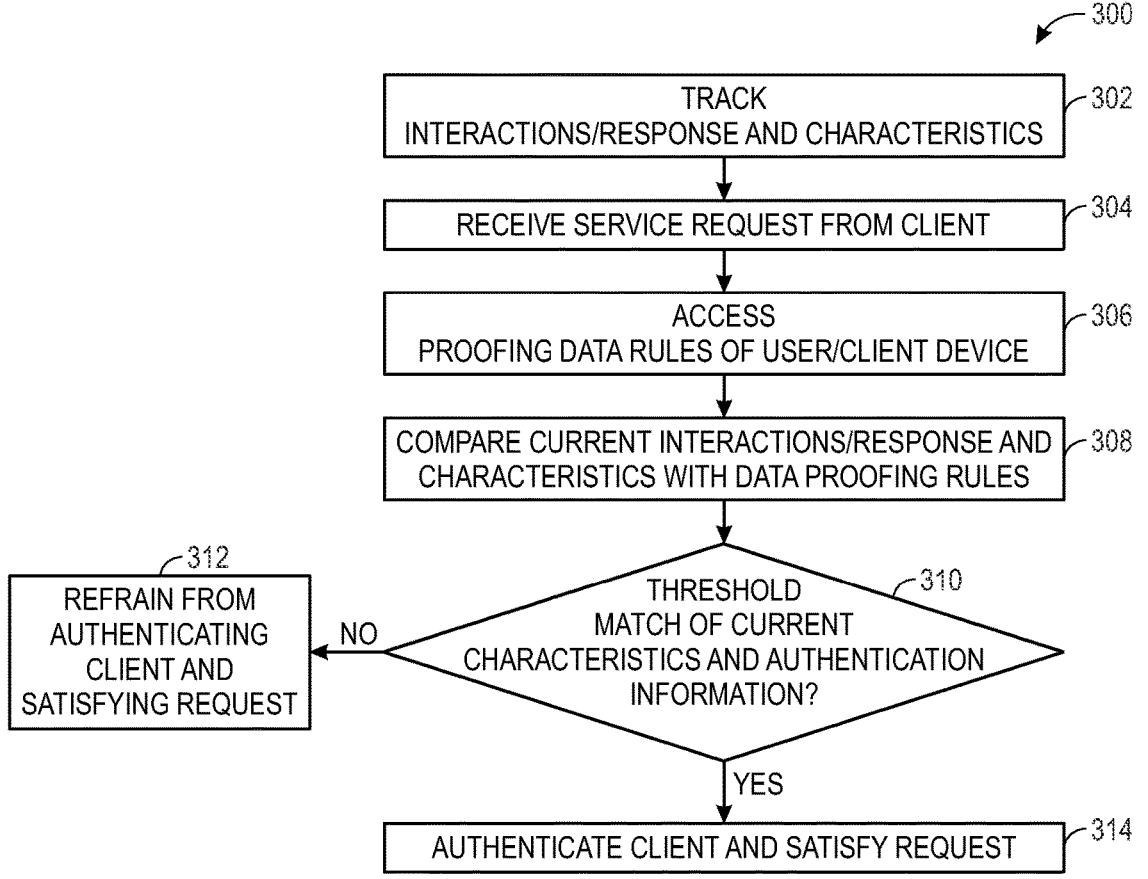
FIG. 3 is a flowchart, illustrating a process for proofing a user based upon IVR-response-based proofing rules, in accordance with certain embodiments.

Once the proofing data rules 120 are generated, subsequent proofing of the user and/or client device 102 may be performed, at least in part, by comparing interactions/responses provided to the proofing data rules 120. FIG. 3 is a flowchart, illustrating a process 300 for proofing a user based upon IVR-response-based proofing rules, in accordance with certain embodiments. For simplicity, FIG. 3 will be discussed concurrently with the electronic access facilitation discussion of FIG. 1.

It is important to note that while in some instances, the proofing data rules 120 may exclusively provide the proofing of the user and/or client device 102, in other situations, it is contemplated that the proofing data rules 120 are used as a supplemental proofing mechanism to other more traditional proofing mechanisms, such as providing a username and password.

When the user and/or client device 102 provides a request 124 to access to a protected portion of the electronic service 106 (e.g., either directly and/or via the IVR system 104), the user and/or client device 102 may need to be authenticated. To do this, interactions/responses 124 and interaction/response characteristics with the electronic service 106 and/or the IVR system 104 are tracked (block 302).

In response to receiving a request to access an electronic service (or a protected portion of an electronic service) (block 304), the proofing data rules 120 of the user and/or client device 102 are accessed (block 306) (e.g., from the data store 122).

The tracked interactions/responses 125 and/or their characteristics are compared with the proofing data rules 120 (block 308) to determine whether there is a threshold level of match between the current interactions/responses 125 and/or their characteristics and the proofing data rules 120 (decision block 310). A client authentication response 126 may be provided, indicating whether the client is authenticated. Based upon the authentication results, a response 128 either declining or authorizing the request 124 may be provided.

For example, if there is not a threshold level of match that provides a threshold level of proofing confidence, the electronic service 106 refrains from providing the user and/or client device 102 with access to the protected portion of the electronic service 106 (block 312). However, if there is a threshold match indicative of a threshold proofing confidence that the user and/or client device 102 is who they say they are and/or are believed to be, the electronic service 106 permits access and satisfies the request 124 (block 314) (e.g., via response 128).

Turning now to examples of interactions/responses and/or interaction response/interaction characteristics that may be used for proofing, FIG. 4 is a schematic diagram, illustrating weighted proofing data used to generate proofing data rules 400 to proof a user via IVR responses, in accordance with certain embodiments. As mentioned previously, the proofing data rules 400 may be associated with particular user and/or client devices 102 (e.g., via user and/or client device identifier 402). For example, proofing data rules 404 are associated with a user and/or client device identifier "1" and proofing data rules 406 are associated with a user and/or client device identifier "2" that represents a different user and/or client device. The proofing data rules 400 may include particular interactions/responses and/or interaction/response characteristics 408 that in proofing. For example, an interaction (e.g., 410A and/or 410B) selecting a particular language preference (e.g., English or Spanish) may be helpful in proofing an indication of a user and/or client device 102. Further, characteristics, such as voice characteristics used in interactions may be helpful in proofing an indication of a user and/or client device 102. For example, particular timbre and/or pitches (e.g., 412A and/or 412B), particular cadences (e.g., 414), language patterns (e.g., lack of use of contractions 416, frequent use of words (e.g., "um" as indicated by 418) may be helpful in proofing an indication of a user and/or client device 102. Additionally, certain navigational choices may be recognized as a pattern of a user and/or client device 102 and, thus, useful for proofing. For example, if a user and/or client device 102 typically uses a shortcut navigation option (e.g., 420), this may be used to proof the user and/or client device 102.

The proofing data rules 400 may include a confidence score 422, which may indicate how confident the machine learning engine 118 is that a corresponding interaction/response and/or characteristic will be present for a particular user and/or client device 102. For example, if user and/or client device 102 always selects "English" as a language, the confidence score may be 100% (or a bit lower, such as 98% to account for mis-selection of language during a particular session). As will be discussed in more detail below, the confidence scores 422 may be used to generate an accumulated proofing confidence score based upon interactions/response during a session.

As may be appreciated, the proofing data rules 400 may be used to proof for third party electronic services that are independent from the initial IVR system and/or electronic service where the response data was captured for generation of the proofing data rules. In such a scenario, the confidence scores 422 may be adjusted to account for differences between the electronic service where the response data was captured for generation of the proofing data rules and the third party electronic service. To do this, the machine learning engine 118 may identify characteristic differences between these systems (e.g., differences in prompts, navigational options, etc.) and train the machine learning models based at least in part upon this data. With this training, modifications in the confidence scores 422 may be identified for specific third party electronic services. For example, when an option to select "Spanish" is offered via an English prompt, the user may be less likely to select the option than when offered via a Spanish prompt. Accordingly, when the machine learning engine 118 identifies that a third-party electronic service offers this option in the English prompt, but the proofing data source electronic service and/or IVR system offers the prompt in Spanish, the confidence score of the proofing data rule associated with the selecting a "Spanish" language option may be reduced.

Having discussed the proofing data rules, the discussion now turns to an example proofing. FIG. 5 is a schematic diagram, illustrating a sequence 500 of IVR interactions and proofing steps 502 based upon those interactions, in accordance with certain embodiments. As illustrated, a user and/or client device 102 purporting to be and/or identified as having the user and/or client device id of "2" has started a session 504 with the IVR system. Upon initiating the session 504, the IVR system 104 may track interactions/responses of the user and/or client device 102. The IVR system 104 provides a prompt for a Spanish preference 506. As illustrated in the proofing data rules 400 of FIG. 4, there is a 98% chance of the user selecting the Spanish language preference. However, as illustrated by the time lapse 508, the user and/or client device 102 does not select this preference and instead continues with an interaction/response 510 asking for a bank balance. As may be appreciated, accessing an electronic service to obtain personal banking balances may be protected and proofing of the user and/or client device 102 may be desired. Accordingly, proofing analysis may be performed to identify whether the interactions/responses and/or their characteristics provide threshold proofing confidence of the user and/or client device 102. Here, the failure to request a Spanish language preference results in failure of a response/interaction that is 98% likely to occur by the user and/or client device 102. However, the timbre/pitch of the user's interaction/response 510 does match the proofing data rules 406, which is 90% likely to occur within the interaction/response. These two features, taken together do not provide enough confidence of proofing up the user and/or client device 102. Accordingly, at this point, access to the balance may be denied or more data may be requested, as illustrated with action callout 512. For example, here, the IVR system 104 may identify that the proofing data rules include a shortcut preference 420 that may help in proofing. Accordingly, the IVR 104 may attempt to trigger this preference by providing an additional prompt that may test whether the shortcut preference 420 will be invoked. Here a "did you know" prompt 514 is provided, which cause the user and/or client device 102 to invoke the shortcut preference (e.g., via an "operator" response 516). The invocation of the shortcut preference 420 provides enough response data for a threshold level match for a particular proofing confidence level. As may be appreciated, multiple levels of proofing confidence may be available, each providing different levels of access to electronic services. For example, when there is a low confidence, the user and/or client device 102 may have to provide a two-factor authentication, which may be more burdensome, but necessary since there is low proofing confidence. In a medium proofing confidence level, the user may have to provide some additional information (e.g., credentials, etc.) to authenticate the user, but may not be required to perform two-factor authentication. With a high proofing confidence level, the user may be granted access automatically without providing additional information.

Here, the proofing confidence level of 80% is a mid-level confidence. Accordingly, as illustrated by the action callout 518, a reduced authentication requirement is determined and a prompt 520 for this reduced authentication requirement is provided (e.g., here a request for the user's zipcode). The user provides their zipcode in a response 522, which when correct, provides access to the electronic service to satisfy the user's request. Accordingly, here, the IVR system 104 provides in an automated response 524, the user's balance, as requested.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

8

The invention claimed is:

1. A tangible, non-transitory computer-readable medium, comprising computer-readable instructions that when executed by one or more processors of one or more computers, cause the one or more computers to:

during an interactive voice response (IVR) system session, perform an initial proofing of a user via one or more credentials supplied by the user via the IVR system session;

track interactions by the user with the IVR system;

after the initial proofing of the user, record response datasets comprising an indication of the tracked interactions by the user and an association of a user account of the user in a response data store;

periodically access the response datasets and generate, update, or both interaction-based proofing data rules based on the accessed response datasets;

provide the interaction-based proofing data rules for subsequent proofing of the user based upon subsequent actions of the user;

generate, update, or both the interaction-based proofing data rules based on particular preferences indicated by the tracked interactions, wherein the particular preferences comprise a language preference, a shortcut preference, or both;

identify a request to access a protected portion of an electronic service;

in response to identifying the request to access the protected portion of the electronic service, perform proofing of the user via the interaction-based proofing data rules; and provide access to the protected portion of the electronic service based upon the proofing of the user via the interaction-based proofing data rules, by:

determining a level of match of a subsequent set of tracked interactions, characteristics of the subsequent set of tracked interactions, or both with expected interactions, expected characteristics of interactions, or both specified in the interaction-based proofing data rules; and providing the access based upon the level of match, by:

when the level of match comprises a first level of match, require a first set of additional authentication data to grant the access;

when the level of match comprises a second level of match greater than the first level of match, require a second set of additional authentication data less than the first set of additional authentication data to grant the access; and when the level of match comprises a third level of match greater than the second level of match, require a third set of additional authentication data less than the second set of additional authentication data to grant the access.

2. The tangible, non-transitory computer-readable medium of claim 1, comprising computer-readable instructions that when executed by the one or more processors of the one or more computers, cause the one or more computers to:

generate, update, or both the interaction-based proofing data rules based upon characteristics of the tracked interactions.

3. The tangible, non-transitory computer-readable medium of claim 2, wherein the characteristics of the tracked interactions comprise at least one of: a timbre, pitch, or both of a voice making the tracked interactions, a cadence speed of speech making the tracked interactions, and a language usage used in making the tracked interactions.

4. The tangible, non-transitory computer-readable medium of claim 1, comprising computer-readable instructions that when executed by the one or more processors of the one or more computers, cause the one or more computers to:

when there is not enough tracked interactions to proof the user:

identify a set of particular interactions by the user that will satisfy one or more of the interaction-based proofing data rules; and provide one or more additional interaction prompts to attempt to trigger the particular interactions by the user that will satisfy the interaction-based proofing data rules.

5. The tangible, non-transitory computer-readable medium of claim 1, comprising computer-readable instructions that when executed by the one or more processors of the one or more computers, cause the one or more computers to:

generate, update, or both the interaction-based proofing data rules based upon pattern recognition discerned via a machine learning model applied to the accessed response datasets.

6. The tangible, non-transitory computer-readable medium of claim 5, comprising computer-readable instructions that when executed by the one or more processors of the one or more computers, cause the one or more computers to:

compare a third-party service with the IVR system to identify interaction offering difference between the third-party service and the IVR system;

modify, via the machine learning model, a likelihood of occurrence of certain interactions, certain interaction characteristics, or both based upon the identified differences.

7. A computer-implemented method comprising:

during an interactive voice response (IVR) system session, performing an initial proofing of a user via one or more credentials supplied by the user via the IVR system session;

tracking interactions by the user with the IVR system;

after the initial proofing of the user, recording response datasets comprising an indication of the tracked interactions by the user and an association of a user account of the user in a response data store;

periodically accessing the response datasets and generate, update, or both interaction-based proofing data rules based on the accessed response datasets;

providing the interaction-based proofing data rules for subsequent proofing of the user based upon subsequent actions of the user;

generating, updating, or both the interaction-based proofing data rules based on particular preferences indicated by the tracked interactions;

identifying a request to access a protected portion of an electronic service;

in response to identifying the request to access the protected portion of the electronic service, performing proofing of the user via the interaction-based proofing data rules; and providing access to the protected portion of the electronic service based upon the proofing of the user via the interaction-based proofing data rules, by:

determining a level of match of a subsequent set of tracked interactions, characteristics of the subsequent set of tracked interactions, or both with expected interactions, expected characteristics of interactions, or both specified in the interaction-based proofing data rules; and providing the access based upon the level of match, by:

when the level of match comprises a first level of match, requiring a first set of additional authentication data to grant the access;

when the level of match comprises a second level of match greater than the first level of match, requiring a second set of additional authentication data less than the first set of additional authentication data to grant the access;

when the level of match comprises a third level of match greater than the second level of match, requiring a third set of additional authentication data less than the second set of additional authentication data to grant the access; and when there is not enough tracked interactions to proof the user:

identifying a set of particular interactions by the user that will satisfy one or more of the interaction-based proofing data rules; and providing one or more additional interaction prompts to attempt to trigger the particular interactions by the user that will satisfy the interaction-based proofing data rules.

8. The computer-implemented method of claim 7, comprising:

generating, updating, or both the interaction-based proofing data rules based upon characteristics of the tracked interactions.

9. The computer-implemented method of claim 8, wherein the characteristics of the tracked interactions comprise at least one of: a timbre, pitch, or both of a voice making the tracked interactions, a cadence speed of speech making the tracked interactions, and a language usage used in making the tracked interactions.

10. The computer-implemented method of claim 7, wherein the particular preferences comprise a language preference, a shortcut preference, or both.

11. The computer-implemented method of claim 7, comprising:

generating, updating, or both the interaction-based proofing data rules based upon pattern recognition discerned via a machine learning model applied to the accessed response datasets.

12. The computer-implemented method of claim 11, comprising:

comparing a third-party service with the IVR system to identify interaction offering difference between the third-party service and the IVR system; and modifying, via the machine learning model, a likelihood of occurrence of certain interactions, certain interaction characteristics, or both based upon the identified differences.

* * * * *